(12) United States Patent
Silva et al.

(10) Patent No.: US 6,304,664 B1
(45) Date of Patent: Oct. 16, 2001

(54) SYSTEM AND METHOD FOR MULTISPECTRAL IMAGE PROCESSING OF OCEAN IMAGERY

(75) Inventors: Dennis M. Silva, Fremont; Ronald Abileah, San Carlos, both of CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/368,311

(22) Filed: Aug. 3, 1999

(51) Int. Cl.[7] ........................................ G06K 9/00
(52) U.S. Cl. ........................................... 382/100
(58) Field of Search ............................ 382/100, 162, 382/163, 165, 169, 172, 173, 174, 276, 312, 318, 321; 340/146.2, 815.4, 815.41, 850, 853.1, 500; 348/81; 250/573, 574; 356/436; 359/141; 372/35; 396/7, 9, 20, 21, 25, 310

(56) References Cited

U.S. PATENT DOCUMENTS

| | | | |
|---|---|---|---|
| 5,243,541 | * 9/1993 | Ulich | 348/81 |
| 5,371,542 | * 12/1994 | Pauli et al. | 348/262 |
| 5,661,817 | * 8/1997 | Hatlestad et al. | 382/110 |
| 5,805,106 | * 9/1998 | Baum | 342/159 |
| 6,028,672 | * 2/2000 | Geng | 356/376 |

* cited by examiner

Primary Examiner—Andrew W. Johns
Assistant Examiner—Shervin Nakhjavan
(74) Attorney, Agent, or Firm—Oppenheimer Wolff & Donnelly, LLP

(57) ABSTRACT

A system and method are provided for separating ocean surface reflected light, atmosphere and ocean scattered light, and anomalous objects in multispectral ocean imagery. The method begins with input image data including a plurality of pixels. The pixels are analyzed and exceptionally "red" pixels are eliminated from further processing. A processed image is produced by subtracting the estimated reflected and scattered light. The output image can then be provided for human analysis or further automated computer processing to locate anomalous objects on or below the ocean surface.

19 Claims, 4 Drawing Sheets

SYSTEM AND METHOD FOR MULTISPECTRAL IMAGE PROCESSING OF OCEAN IMAGERY

FIELD OF INVENTION

The present invention relates to multispectral imaging. In particular, the present invention teaches a variety of systems and methods for facilitating the separation of ocean surface reflected light, light scattered in the ocean and atmosphere, and anomalous objects in multispectral ocean imagery. The intent of the processing is to detect the anomalous objects, which may be either on or below the ocean surface.

BACKGROUND OF THE INVENTION

Detection of low contrast objects in the ocean has many applications including environmental monitoring, locating schools of fish and sunken ships, and aiding search and rescue operations. Furthermore, military applications include countermine measures (CMM) and anti-submarine warfare (ASW). In addition, navigation applications include the detection and avoidance of navigation hazards, and the interpretation of ocean bottom topographies, such as reefs.

Multispectral images taken from above the ocean's surface generally contain background clutter consisting of light reflected from the ocean surface, light scattered in the atmosphere above the ocean, and upwelling from scattering the water column. Relative to the background clutter, the anomalous objects of interest are generally of very low contrast. The challenge is in removing the pervasive background light so as to render anomalous surface or underwater objects more visible.

Most ocean clutter is due to light reflected from the surface. The prior art to filter ocean clutter includes two methods; one based on temporal averaging of multiple monochromatic images, and the second using multispectral imaging. Temporal averaging uses a video camera. The sequence of images is corrected for frame-to-frame perspective, translational, rotational and magnification changes before stacking (integration). The integration approach works because surface light is modulated at the frequency of the surface waves. Integrating over a time period spanning the wave period, or longer, decreases the surface light. Typical ocean waves of order of 100 m can be filtered with 10-second or longer integration. Shorter waves, order of 1 m, can be filtered just as well in as little as 3 seconds. The method is effective in removing only the surface reflection. It does not eliminate the upwelling light clutter.

The prior art multispectral method makes a global estimate of the background light spectrum and subtracts the estimate pixel-by-pixel. This method implicitly assumes that the background spectrum can be described by a global 1-component spectrum. Prior art as depicted in FIGS. 1A and 1B illustrats multispectral imaging system configurations. The systems use data collected by multispectral imaging systems flown over the ocean, on satellites, (FIG. 1A) or aircraft (FIG. 1B). They work in the daytime, using sunlight to illuminate the object of interest. The imaging camera is usually staring down (nadir view). Typically, the camera is a high quality CCD imaging camera that simultaneously images in several (typically 2 to 10) spectral bands (multispectral), or up to hundreds of spectral bands (hyperspectral).

Thus, there have generally been two different methods utilized for removing the unwanted light reflection in an ocean image. One exploits multiple spectral bands, and the other uses time integration. The choice of which is used leads to different sensor designs—one is a multispectral or hyperspectral imager; the other is simply a long exposure or video camera (possibly with a select narrow spectral band filter).

However, a 1-componenet model does not accurately capture the spectral variability of the clutter because the light in each image pixel is actually a mixture of several components, each having a different spectrum, in relative amounts that can vary from one pixel to another. It is highly desirable to have a process that represents the reflected light more accurately than is possible utilizing a 1-component process. The desired process would subtract much more light clutter, thus making fainter objects easier to detect. In addition, the desired process should allow faster processing of the multispectral image data.

SUMMARY OF INVENTION

The present invention addresses the aforementioned characteristics by providing a de-glinting process that utilizes a two component model to estimate reflected light from the ocean surface and scattered light from the water column below the surface. The advantage of the present invention over the prior art 1-component model is that the 2-component model of the present invention more accurately represents the reflected light. These enables the present invention to subtract much more light clutter than is possible utilizing a 1-component model, making fainter objects easier to detect. In addition, the present invention is generally able to process image data faster than previous 1-component processes. Under certain conditions, the present invention is able to process image data 100 times faster than 1-component processes.

The system includes an input device for obtaining the image data, a device, such as a computer, for analyzing the image data and applying the two-component process, and an output device for outputting the clutter subtracted image.

DESCRIPTION OF DRAWINGS

The foregoing and other objects, aspects and advantages are better understood from the following detailed description of a preferred embodiment of the invention with reference to the drawings, in which.

Prior Art

Prior Art

Figure 1A:
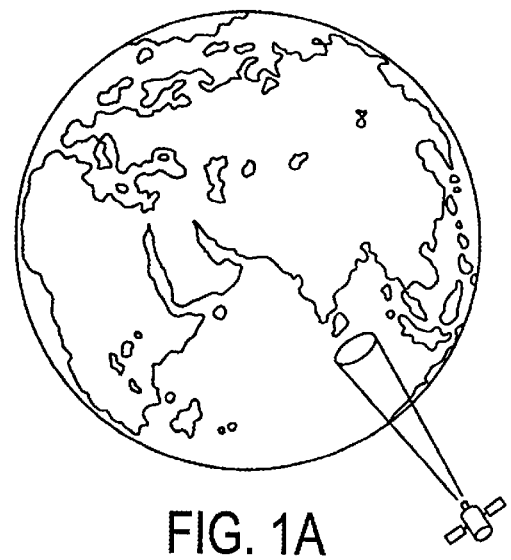
FIG. 1A is an illustration of a prior art system for recording multispectral imagery utilizing a satellite.
Figure 1B:
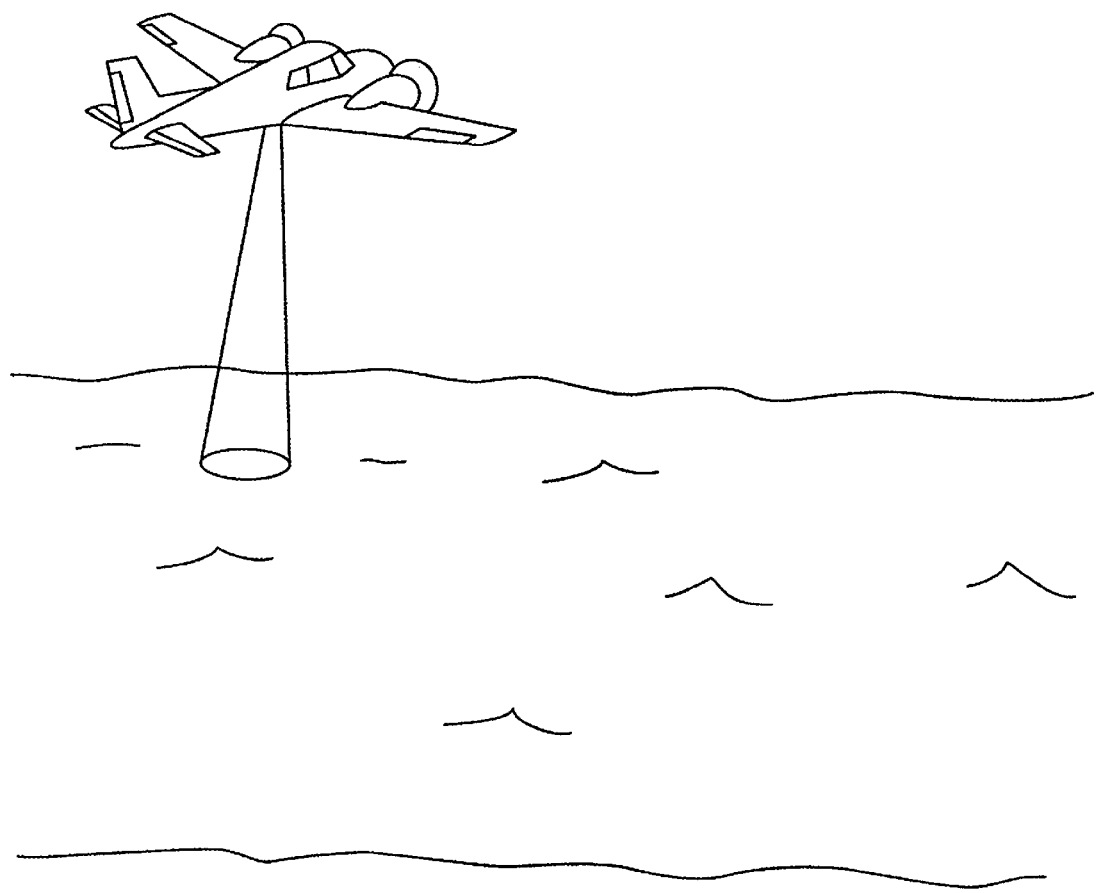
Figure 2:
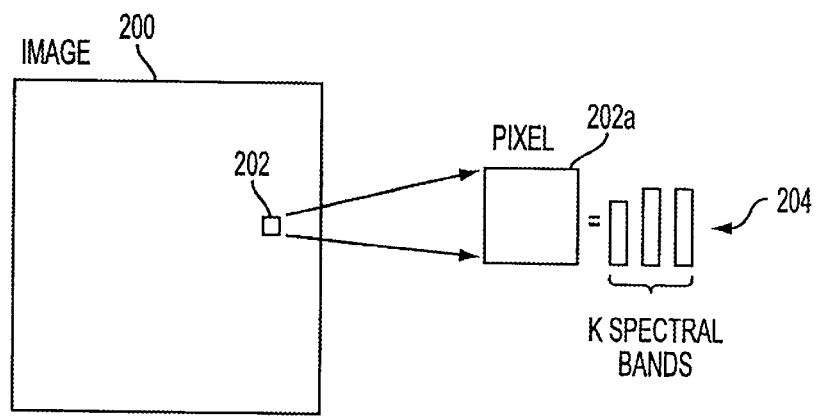
Figure 3:
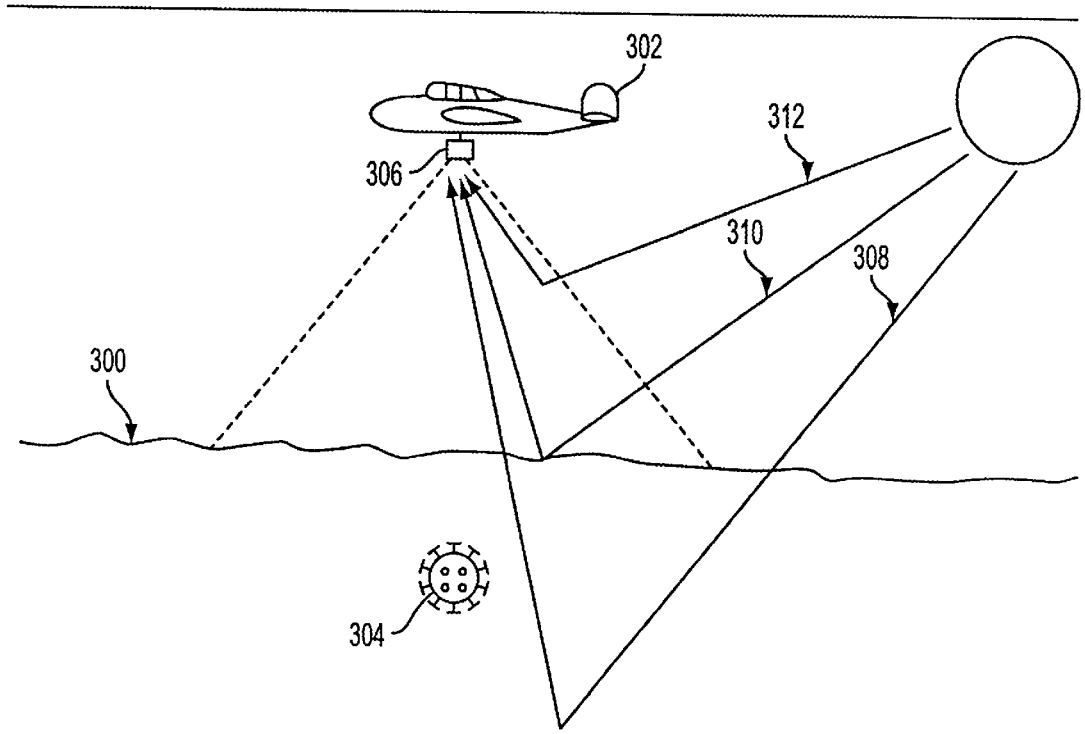
Figure 4:
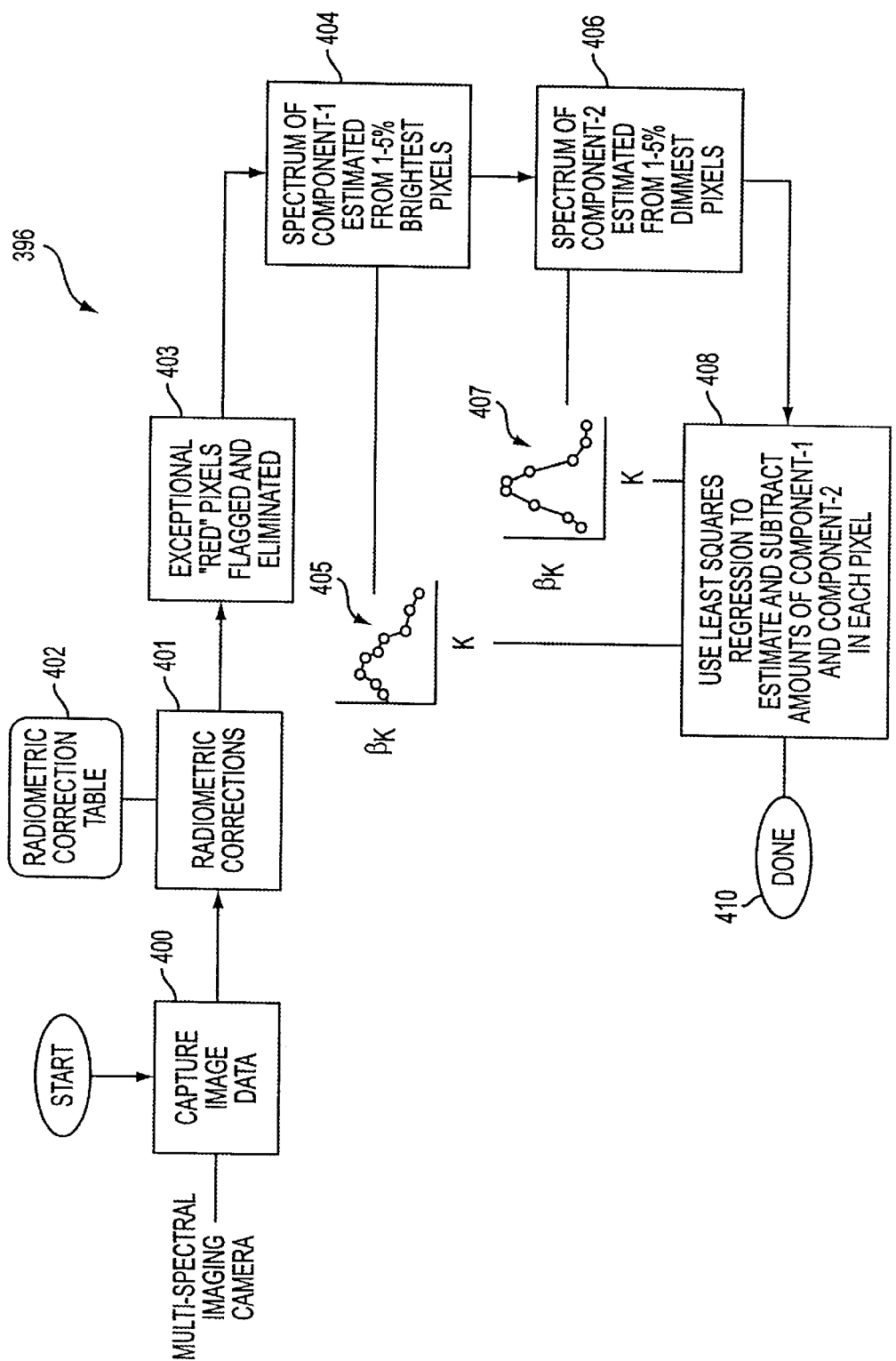
Figure 5:
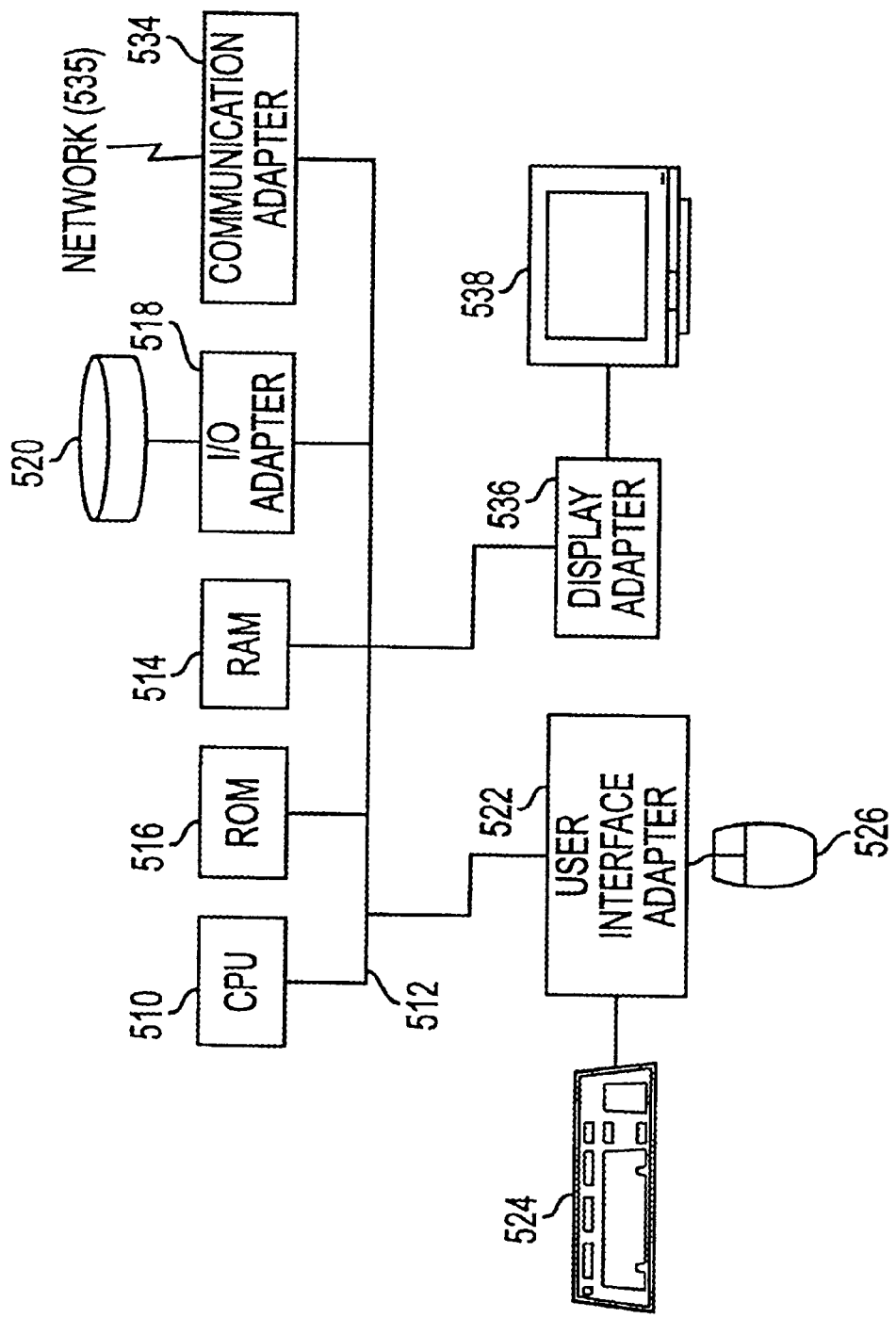

FIG. 1B is an illustration of a prior art system for recording multispectral imagery utilizing an aircraft;

FIG. 2 is an illustration showing a typical multispectral image;

FIG. 3 is an illustration showing various components of light arriving at a sensor while recording multispectral ocean imagery;

FIG. 4 is a flowchart showing a multispectral imaging process utilizing a two-component light clutter model in accordance with the present invention; and FIG. 5 is an illustration showing a typical hardware configuration of a workstation in accordance with one embodiment of the present invention.

DETAILED DESCRIPTION OF THE PREFERRED EMBODIMENTS

As shown in FIGS. 1A and 1B, multispectral imagery data generated for use by the present invention is often recorded utilizing systems flown over the ocean on satellites (FIG. 1A) or aircraft (FIG. 1B). As described in more detail below, sensors aboard the vehicle record the image data, which is then passed on for further processing. As will be appreciated by those skilled in the art, the data for the present invention may be generated utilizing a variety of suitable sensors and vehicles.

FIG. 2 is an illustration showing a typical multispectral image including an enlarged view of a pixel. The image 200 is composed of a plurality of discrete pixels 202. As shown in the enlarged pixel 202a of FIG. 2, each pixel 202a has a radiance in a plurality of spectral bands 204. Although a pixel can have a radiance in any number of two or more spectral bands 204, preferably each pixel 202a will have a radiance in 2 to 10 spectral bands 204.

The number of pixels 202 used to represent an image 200 determines the number of data values needed to represent the image 200. Assuming N is the width of the image 200 in pixels 202, M is the length of the image 200 in pixels 202, and K is the number of spectral bands 204 per pixel 202, the image 200 will have N×M×K data values. As can be seen, the use of large images 200, and more spectral bands 204 requires more data to represent the image 200.

Generally, the smaller the pixel size, the clearer the image 200. However, an image with smaller pixels generally requires more pixels 202 to represent the image 200 and, as a result, requires more data values to represent the image 200. The number of data values in an image affects how fast an image 200 may be processed. Generally, the more data values, the longer the image processing will take.

FIG. 3 is an illustration showing various components of light arriving at a sensor while recording multispectral ocean imagery. The multispectral imaging system is generally flown over the ocean 300 on a vehicle such as an aircraft 302.

The recording of image data is generally done in the daytime, using sunlight to illuminate an object of interest 304. The sensor 306 is typically a camera staring down (nadir view). Generally, the camera is a high quality CCD imaging camera that simultaneously images in two or more spectral bands. The sensor can be either a multispectral imaging camera or a hyperspectral push-broom sensor. The present invention is preferably used with 2–10 spectral bands. Although hyperspectral systems typically have more than 100 bands, for ocean imagery the bands are generally summed and re-binned to about 10 bands. In one implementation, all or most bands are in the visible, 0.4 to 0.7 microns, although an extra band in the deep red or Near-Infrared (0.8 to 1.0 micron) can be useful, as described later.

The light arriving at the sensor 306 can be partitioned into several components. The present invention considers three basic components. The first component is an upwelling component 308, which consists of solar light that penetrates the surface and is subsequently scattered back in the direction of the sensor. The second component is a surface reflection component 310. The third component is the sky component 312, which consists essentially of reflected light scatter arising from atmospheric particles.

The present invention exploits the fact that the spectrum of light scattered from beneath the surface 308 is significantly altered by the seawater that it must transit on its way to the sensor 306. The most important difference occurs in the red portion of the spectrum where absorption effects are most prominent. As a consequence, the light that is reflected from the surface 310 of the ocean has a larger red component than light that has passed through the ocean. The difference is large enough to provide an effective discriminant for isolating the upwelling and surface reflected components of the light entering the sensor 306. Taken in order by component, the upwelling light $I^{(u)}(\lambda)$ 308 is characterized as being spatially uniform (that is, a function of wavelength only), taking on the dominant blue-green characteristics of light transport in seawater. The surface reflection or glint component $f^{(g)}(x,y)I^{(g)}(\lambda)$ 310 has the characteristic spectrum of solar light irradiance at the ocean surface $I^{(g)}(80)$, and has more red content relative to the upwelling component. The spatial piece of the glint component $f^{(g)}(x,y)$ characterizes the spatial variability caused by varying surface wave slope. The sky component $f^{(b)}(x,y)I^{(b)}(\lambda)$ characterizes the reflected sky color and is primarily due to Rayleigh scatter, although it is also sensitive to the presence of cloud shadows, haze, and so on. Combining the three terms, the total background light arriving at the sensor $I(x,y,\lambda)$ may be written as:

$$I(x,y,\lambda)=I^{(u)}(\lambda)+f^{(g)}(x,y)I^{(g)}(\lambda)+f^{(b)}(x,y)I^{(b)}(\lambda) \tag{1}$$

Given only the intensity of the light arriving at the sensor, it is difficult to separate the upwelling component 308 from the sky component 312, inasmuch as the spectral properties of the latter are not known and their relative magnitudes are often competitive. For the purpose of this invention, a two component approximation to the above Equation 1 combines the upwelling 308 and sky 312 components into a single scattering component given by:

$$I^{(u)}(\lambda)+f^{(b)}(x,y)I^{(b)}(\lambda) \rightarrow f^{(s)}(x,y)I^{(s)}(\lambda), \tag{2}$$

So that the model for the light arriving at the sensor 306 can be written as:

$$I(x,y,\lambda) \equiv f^{(s)}(x,y)I^{(s)}(\lambda)+f^{(g)}(x,y)I^{(g)}(\lambda) \tag{3}$$

In the present invention, the scattered and glint spectra are estimated from the data by ensembling the spectra based on intensity. The intensity of each pixel is represented by the total radiance of all spectral bins. Here, the pixels with the brightest intensities (top 1–5%) are used to estimate the glint spectrum, and the pixels with dimmest intensities (bottom 1–5%) are used to estimate the scatter spectrum.

Expressed in mathematical terms, the model becomes:

$$X_{ijk}=\alpha_{ij}\beta_k+a_{ij}b_k+R_{ijk}, \tag{4}$$

Where $X_{ijk}$=the pixel intensity at a specific location and wavelength $\alpha_{ij}$=the relative amplitude of the scattered light intensity $\beta_k$=the estimated spectrum of the scattered light intensity $a_{ij}$=the relative amplitude of glint intensity $b_k$=the estimated spectrum of glint intensity $R_{ijk}$=the residual light intensity k=the spectral bin index ij=the pixel location index FIG. 4 is flowchart showing a two-component multispectral imaging process 396 in accordance with one embodiment of the present invention. The imaging process 396 utilizes a two-component reflected light model suitable for processing ocean imagery in order to detect submerged and exposed objects. The first component is associated with surface reflection from the wave facets (i.e., "glint"). The second component is dependent upon both the upwelling component and light scatter from the atmosphere. By utilizing the two-component model of the present invention, the process 396 is capable of eliminating a substantial amount of background light that may possibly obscure the object of interest.

The imaging process 396 begins with a start operation 400, wherein the initialization, data gathering, and data processing necessary for the proper completion of imaging process 396 are performed. For example, input data must be provided to the process 396 at operation 400. The input data may be a pixel image gathered through aerial imaging, satellite imaging, or the like. Typically the provided pixel image includes N×M pixels with a radiance in each of K spectral bands for each pixel. Thus, there are N×M×K data values. As will be appreciated, the present invention can operate on many different spectral bands, the provided number depending upon the application. A minimum of two spectral bands is required. The effectiveness of clutter removal increases substantially with three, four, and five spectral bands. Experience shows that there is some additional improvement up to 10 spectral bands. Beyond 10, the marginal utility decreases significantly while the hardware and computational cost increase. For ocean applications, it is believed that between 3 and 10 spectral bands are adequate and represent a practical compromise between performance and cost.

Prior to processing with the algorithm described herein, the images are preferably radiometrically calibrated in operation 401. That is, the value in each pixel and each spectral band is radiometrically calibrated to the highest precision possible with current art. The purpose is to remove pixel-to-pixel spectral response variations. Techniques for radiometric calibration are well known. They often involve laboratory measurements of the spectral response in each pixel and each spectral band. These measurements are then transformed into a look-up table of corrections 402 for each pixel-spectral band. Errors in the calibration result in added noise in the image data, which degrades the results obtained with the multispectral processing described below. There are also established techniques to derive the corrections from analysis of the image data in "real-time."

In an operation 403, exceptionally "red" pixels may be flagged and eliminated from further processing. These edited pixels are believed to represent ocean whitecaps. Whitecaps obscure features of interest, such as submerged mines. Since whitecaps generally cover only 1% of the ocean surface, editing them now has little impact on detection of objects of interest and eliminates many false alarms. Furthermore, "red" pixels are likely to be saturated, i.e., their amplitude exceeds the dynamic range of the sensor. Hence, their spectra are corrupted and not appropriate for further processing. The criterion for editing is that the pixel intensity in the deep red or NIR (about 0.8 micron) is more than the intensity of orange (about 0.62 micron). This type of differentiation is possible only with imaging systems that cover deep-red and NIR, and have sufficient spectral resolution to differentiate these colors from orange. Generally, that means about 10 spectral bands. With simpler systems that do not provide the spectral range and resolution, this step is eliminated. This step may also be eliminated when the spectral characteristics of the target of interest mimic those of white caps.

Flagged pixels are not used in the spectral estimation process described below. The flagged pixels will be treated as missing data. They are completely ignored in the rest of the process. In the final output they can be either represented as holes in the data or, to render an ecstatically pleasing picture, filled in by interpolation using neighboring pixel values.

As discussed above, the two-component process is based on a two-component model shown by:

$$I(x,y,\lambda) = f^{(s)}(x,y) I^{(s)}(\lambda) + f^{(g)}(x,y) I^{(g)}(\lambda)$$

Estimates of $I^{(s)}(\lambda)$ and $I^{(g)}(\lambda)$ are obtained from the image data under the assumption that the brightest pixels provide the purest examples of glint light and the dimmest pixels provide the purest examples of scattered light. The spatial coefficients $f^{(g)}(x,y)$ and $f^{(s)}(x,y)$ are then obtained by an error minimization technique and combined with the spectral estimates to produce an estimate of the background for each channel at each pixel location. The output image is then obtained by subtracting the background estimate from the input image data.

Referring back to FIG. 4, a two-component process will now be described. In operation 404, the spectrum of component 1 is estimated from the 1–5% brightest pixels. As described above, the 1–5% brightest pixels are the purest examples of glint light and are therefore used to estimate $I^{(g)}(\lambda)$ 405.

In operation 406, the spectrum of component 2 is estimated from the 1–5% dimmest pixels. As described above, the 1–5% dimmest pixels are the purest examples of scattered light and are therefore used to estimate $I^{(s)}(\lambda)$ 407. However, other parameter ranges may be better suited depending on the context.

In operation 408, a least squares regression is used to estimate and subtract the amounts of component 1 and component 2 present in each pixel. The output image is provided for further processing or viewing.

The two-component based process of the present invention has the advantage of being more accurate in modeling the light clutter than one-component based approaches. In addition, the two-component based process of the present invention is computationally simple, making it particularly well suited for real-time processing.

The present invention may be embodied in many different ways. One preferred embodiment of the present invention is a workstation including logic which applies the two-component de-glinting process to the input image data. A representative hardware environment is depicted in FIG. 5, which illustrates a typical hardware configuration of a workstation having a central processing unit 510, such as a microprocessor, and a number of other units interconnected via a system bus 512. The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, and/or other user interface devices such as a touch screen (not shown) to the bus 512, communication adapter 534 for connecting the workstation to a communication network (e.g., a data processing network) and a display adapter 536 for connecting the bus 512 to a display device 538. The workstation typically has resident thereon an operating system such as the Microsoft Windows NT or Windows/95 Operating System (OS), the IBM OS/2 operating system, the MAC OS, or UNIX operating 20 system.

Logic for applying the two-component process is generally located in the RAM 514 or ROM 516 of the system and executed by the CPU 510. Image data are input into the system via I/O adapter 518, for stored image data, or through the communication adapter 534, for image data received via a network connection.

After processing the input image data, the resultant image can be displayed on the display device 538 via the display adapter 536.

The logic for applying the two-component process can take many forms, including a computer program embodied on a computer readable medium, such as a computer readable disk 520. In this embodiment, the program is read from the disk 520 and stored into RAM 514 before program execution. The logic can also take the form of an Application Specific Integrated Circuit (ASIC).

While this invention has been described in terms of several preferred embodiments, it is contemplated that alternatives, modifications, permutations and equivalents thereof will become apparent to those skilled in the art upon a reading of the specification and study of the drawings. It is therefore intended that the following appended claims include all such alternatives, modifications, permutations and equivalents as fall within the true spirit and scope of the present invention.

We claim:

1. A multispectral imagery method suitable for use in detecting small low contrast objects present in the ocean, the multispectral imagery method operable to decrease detection interference arising from upwelling and reflected light information present in pixel based image data, the multispectral imagery method comprising the operations of:
   providing an image data including a plurality of pixels;
   applying a two-component de-glinting process to the image data, wherein the two component de-glinting process comprises the operations of:
     estimating a spectrum of component 1 from the brightest pixels in said image data;
     estimating a spectrum of component 2 from the dimmest pixels in said image data; and
     subtracting the amounts of said spectrum of component 1 and said spectrum of component 2 present in each said pixel.

2. The method set forth in claim 1, wherein each pixel includes a radiance in no less than 3 spectral bands.

3. The method set forth in claim 2, wherein each pixel includes a radiance in no greater than 10 spectral bands.

4. The method set forth in claim 1, wherein component 1 is estimated from the 1–5% brightest pixels in the image data.

5. The method set forth in claim 1, wherein component 2 is estimated from the 1–5% dimmest pixels in the image data.

6. The method set forth in claim 1, further comprising the operation of eliminating from further processing pixels wherein the intensity in the deepest red and NIR spectral channels are more than the intensity in the orange band.

7. A multispectral imagery system suitable for use in detecting small low contrast objects present in the ocean, the multispectral imagery system operable to decrease detection interference arising from ocean and atmosphere scattered and surface reflected light information present in pixel based image data, the multispectral imagery system comprising:
   a memory device suitable for storing image data including a plurality of pixels;
   an input device that inputs the image data including the plurality of pixels;
   light clutter removal logic that applies a two component de-glinting process to the image data, wherein the two component de-glinting process comprises the operations of:
     estimating a spectrum of component 1 from the 1–5% brightest pixels in said image data;
     estimating a spectrum of component 2 from the 1–5% dimmest pixels in said image data; and
     subtracting the amounts of the spectrum of said component 1 and the spectrum of said component 2 present in each said pixel; and
   an output device that outputs a de-cluttered image data.

8. The method set forth in claim 7, wherein each pixel includes a radiance in no less than 3 spectral bands.

9. The method set forth in claim 8, wherein each pixel includes a radiance in no greater than 10 spectral bands.

10. The system set forth in claim 7, wherein the logic is a computer program embodied on a computer readable medium.

11. The system set forth in claim 7, wherein the logic is an application specific integrated circuit.

12. The system set forth in claim 7, wherein the logic is a computer program embodied in random access memory.

13. The system set forth in claim 7, further comprising logic that eliminates from further processing pixels wherein the intensity in the deepest red and NIR spectral channels are more than the intensity in the orange band.

14. A multispectral imagery computer program embodied on a computer readable medium suitable for use in detecting small low contrast objects present in the ocean, the multispectral imagery computer program operable to decrease detection interference arising from upwelling and reflected light information present in pixel based image data, the multispectral imagery computer program comprising:
   an input code segment that provides image data including a plurality of pixels; and
   a code segment that applies a two component de-glinting process to the image data, wherein the two component process comprises computer executable instructions for:
     estimating a spectrum of component 1 from the 1–5% brightest pixels in said image data;
     estimating a spectrum of component 2 from the 1–5% dimmest pixels in said image data; and
     subtracting the amounts of the spectrum of said component 1 and the spectrum of said component 2 present in each said pixel.

15. The method set forth in claim 14, wherein each pixel includes a radiance in no less than 3 spectral bands.

16. The method set forth in claim 15, wherein each pixel includes a radiance in no greater than 10 spectral bands.

17. The computer program set forth in claim 14, further comprising a code segment that eliminates from further processing pixels wherein the intensity in the deepest red and NIR spectral channels is more than the intensity in the light orange band.

18. A multispectral imagery method suitable for use in detecting small low contrast objects present in the ocean, the multispectral imagery method operable to decrease detection interference arising from upwelling and reflected light information present in pixel based image data, the multispectral imagery method comprising the operations of:
   providing unpolarized image data including a plurality of pixels; and
   applying a two-component de-glinting process to the image data, wherein the two component de-glinting process comprises the operations of:
     estimating a spectrum of component 1 from the brightest pixels in said image data;
     estimating a spectrum of component 2 from the dimmest pixels in said image data; and
   subtracting the amounts of said spectrum of component 1 and said spectrum of component 2 present in each said pixel.

19. A multispectral imagery method suitable for use in detecting small low contrast objects present in the ocean, the multispectral imagery method operable to decrease detection interference arising from upwelling and reflected light information present in pixel based image data, the multispectral imagery method comprising the operations of:

provingd unprocessed image data including a plurality of pixels; and applying a two-component de-glinting process to the image data, wherein the two component de-glinting process comprises the operations of:

estimating a spectrum of component 1 from the brightest pixels in said image data;

estimating a spectrum of component 2 from the dimmest pixels in said image data; and subtracting the amounts of said spectrum of component 1 and said spectrum of component 2 present in each said pixel.

\* \* \* \* \*

UNITED STATES PATENT AND TRADEMARK OFFICE
CERTIFICATE OF CORRECTION

PATENT NO. : 6,304,664 B1
DATED : October 16, 2001
INVENTOR(S) : Dennis M. Silva et al.

It is certified that error appears in the above-identified patent and that said Letters Patent is hereby corrected as shown below:

Column 4,
Line 10 reads, "trum of solar light irradiance at the ocean surface $I^{(g)}(80)$,"; it should read : -- trum of solar light irradiance at the ocean surface $I^{(g)}(\lambda)$, --;
Line 36 reads, "$I(x,y,\lambda) \equiv f^{(s)}(x,y)I^{(s)}(\lambda)+f^{(g)}(x,y)I^{(g)}(\lambda)$" ; it should read
-- $I(x,y,\lambda) \cong f^{(s)}(x,y)I^{(s)}(\lambda)+f^{(g)}(x,y)I^{(g)}(\lambda)$ --;

Column 6,
Line 4 reads, "$I(x,y,\lambda) \equiv f^{(s)}(x,y)I^{(s)}(\lambda)+f^{(g)}(x,y)I^{(g)}(\lambda)$" ; it should read
-- $I(x,y,\lambda) \cong f^{(s)}(x,y)I^{(s)}(\lambda)+f^{(g)}(x,y)I^{(g)}(\lambda)$ --;
Line 57 reads, "Windows/95Operating System (OS), the IBM OS/2 operat- " ; it should read: --Windows/95 Operating System (OS), the IBM OS/2 operat- --

Column 8,
Line 57 reads, "pixels; and" ; it should read -- pixels; --;

Column 9,
Line 8 reads, "pixels; and" ; it should read -- pixels; --;

Signed and Sealed this

Twenty-first Day of May, 2002

Attest:

JAMES E. ROGAN
*Attesting Officer*   *Director of the United States Patent and Trademark Office*